(12) United States Patent
Chen

(10) Patent No.: US 7,407,530 B2
(45) Date of Patent: Aug. 5, 2008

(54) FILTER ASSEMBLY FOR A PNEUMATIC TOOL

(76) Inventor: Kuo-Liang Chen, No. 246-1, Changma Rd., Changhua (TW)

( * ) Notice: Subject to any disclaimer, the term of this patent is extended or adjusted under 35 U.S.C. 154(b) by 377 days.

(21) Appl. No.: 11/226,689

(22) Filed: Sep. 14, 2005

(65) Prior Publication Data
US 2007/0056445 A1    Mar. 15, 2007

(51) Int. Cl.
*B01D 59/26* (2006.01)
*B01D 50/00* (2006.01)

(52) U.S. Cl. .......................... 95/147; 55/385
(58) Field of Classification Search .......... 96/147; 55/385
See application file for complete search history.

(56) References Cited

U.S. PATENT DOCUMENTS

| | | | | |
|---|---|---|---|---|
| 2,579,053 A * | 12/1951 | Schulstadt | ........... | 210/247 |
| 3,681,899 A * | 8/1972 | Grote | ........... | 96/147 |
| 4,136,009 A * | 1/1979 | Samiran | ........... | 210/114 |
| 4,400,187 A * | 8/1983 | Lane | ........... | 96/144 |
| 4,548,624 A * | 10/1985 | Waller | ........... | 96/134 |
| 5,020,610 A * | 6/1991 | Lyon et al. | ........... | 175/135 |
| 2006/0162302 A1 * | 7/2006 | Terrell | ........... | 55/385.1 |

* cited by examiner

*Primary Examiner*—Walter D. Griffin
*Assistant Examiner*—Amber Miller Harris
(74) *Attorney, Agent, or Firm*—Jackson Walker, LLP

(57) ABSTRACT

A filter assembly for a pneumatic tool has an inner housing, a cover, an inner tube and a connecting post. The cover is attached to the inner housing and has a connecting portion and at least one air passage. The connecting portion has an inner space. The at least one air passage communicates with the inner space in the connecting portion. The inner tube is mounted inside the inner housing and defines an annular space between the inner tube and the inner housing to hold filters and/or drying agents inside and communicating with the at least one air passage. The connecting post extends into the inner tube, is detachably connected with the cover and has an air channel and multiple discharging holes. The discharging holes communicate with the air channel in the connecting post and the annular space between the inner tube and the inner housing.

13 Claims, 5 Drawing Sheets

FILTER ASSEMBLY FOR A PNEUMATIC TOOL

BACKGROUND OF THE INVENTION

1. Field of the Invention

The present invention relates to a filter assembly, and more particularly to a filter assembly for a pneumatic tool and that can be disassembled to replace the filters and/or filtering agents.

2. Description of Related Art

To keep moisture and miscellaneous particles in the air from entering a pneumatic tool and to prevent the pneumatic tool from being oxidized and damaged, a filter assembly is attached to the pneumatic tool to leach moisture and miscellaneous particles out of the pressurized air. Without a filter assembly, for example, the paint will mixed with the moisture to cause spraying paint to lose its original color. With reference to FIGS. 4 and 5, a conventional filter assembly (40) in accordance with the prior art comprises a body having two ends provided respectively with a threaded hole and an outer thread. The body is connected to a handle of a pneumatic tool (50) with the threaded hole and is connected to a hose that is connected to a pressurized air source with the outer thread. Filters and drying agents are held inside the body to leach miscellaneous particles and moisture out from the pressurized air transmitted from the hose.

The body of the conventional filter assembly (40) substantially comprises a sleeve (42) with an opening and a cover (44) attached to and closing the opening of the sleeve (42). After putting filters and drying agents into the sleeve (42) through the opening, the cover (44) is securely attached to the sleeve (42) with glue or with an ultrasonic process to close the opening. However, because the cover (44) of the conventional filter assembly (40) cannot be disassembled from the sleeve (42), the filters and drying agents inside the sleeve (42) are not replaceable. When the filters or the drying agents achieve a saturation condition and lose leaching effectiveness, a new filter assembly (40) is needed to replace a used one even if the other parts of the filter assembly (40) are still entirely functional. Therefore, the conventional filter assembly (40) is not friendly to the environment.

To overcome these shortcomings, the present invention tends to provide a filter assembly to mitigate or obviate the aforementioned problems.

SUMMARY OF THE INVENTION

The main objective of the invention is to provide a filter assembly for a pneumatic tool and that can be disassembled to replace filters or drying agents. The filter assembly has an inner housing, a cover, an inner tube and a connecting post. The cover is attached to the inner housing and has a connecting portion and at least one air passage. The connecting portion has an inner space and is formed on the cover to connect with the pneumatic tool. The at least one air passage is defined in the cover and communicates with the inner space in the connecting portion. The inner tube is mounted inside the inner housing and defines an annular space between the inner tube and the inner housing to hold filters and/or drying agents inside and communicating with the at least one air passage in the cover. The connecting post extends into the inner tube, is detachably connected with the cover and has an air channel and multiple discharging holes. The discharging holes are defined in the connecting post and communicate with the air channel in the connecting post and the annular space between the inner tube and the inner housing.

Other objects, advantages and novel features of the invention will become more apparent from the following detailed description when taken in conjunction with the accompanying drawings.

DETAILED DESCRIPTION OF THE PREFERRED EMBODIMENT

Figure 1:
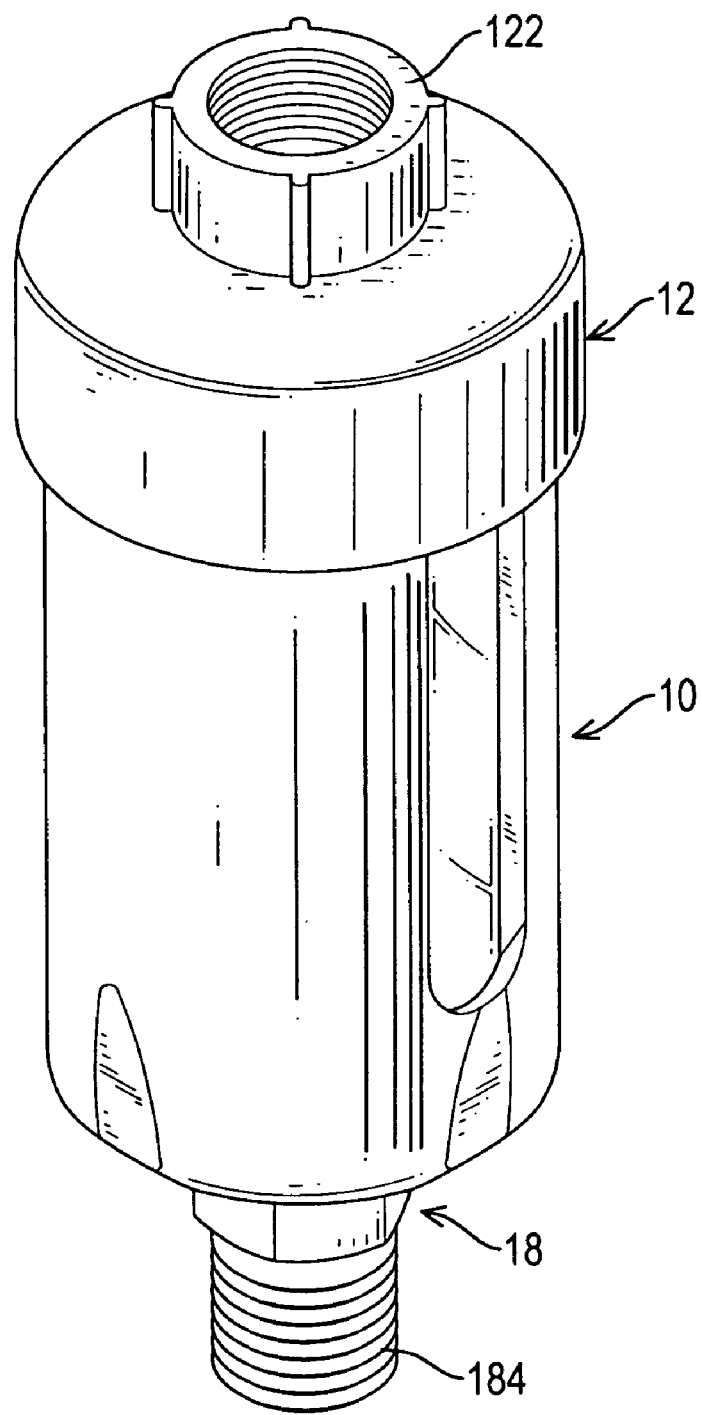
FIG. 1 is a perspective view of a filter assembly in accordance with the present invention.
Figure 2:
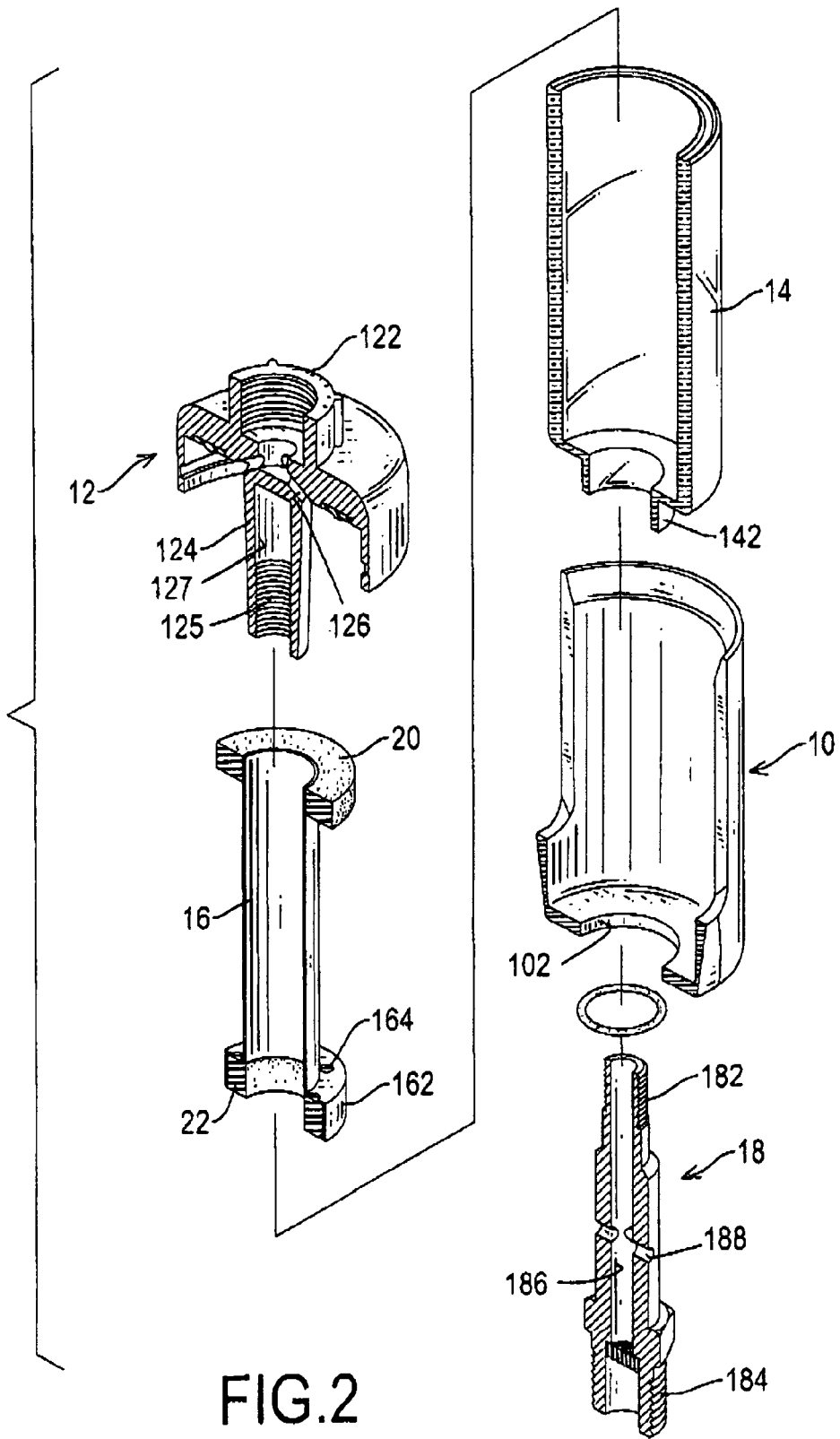
FIG. 2 is an exploded perspective view in cross section of the filter assembly in FIG. 1.
Figure 3:
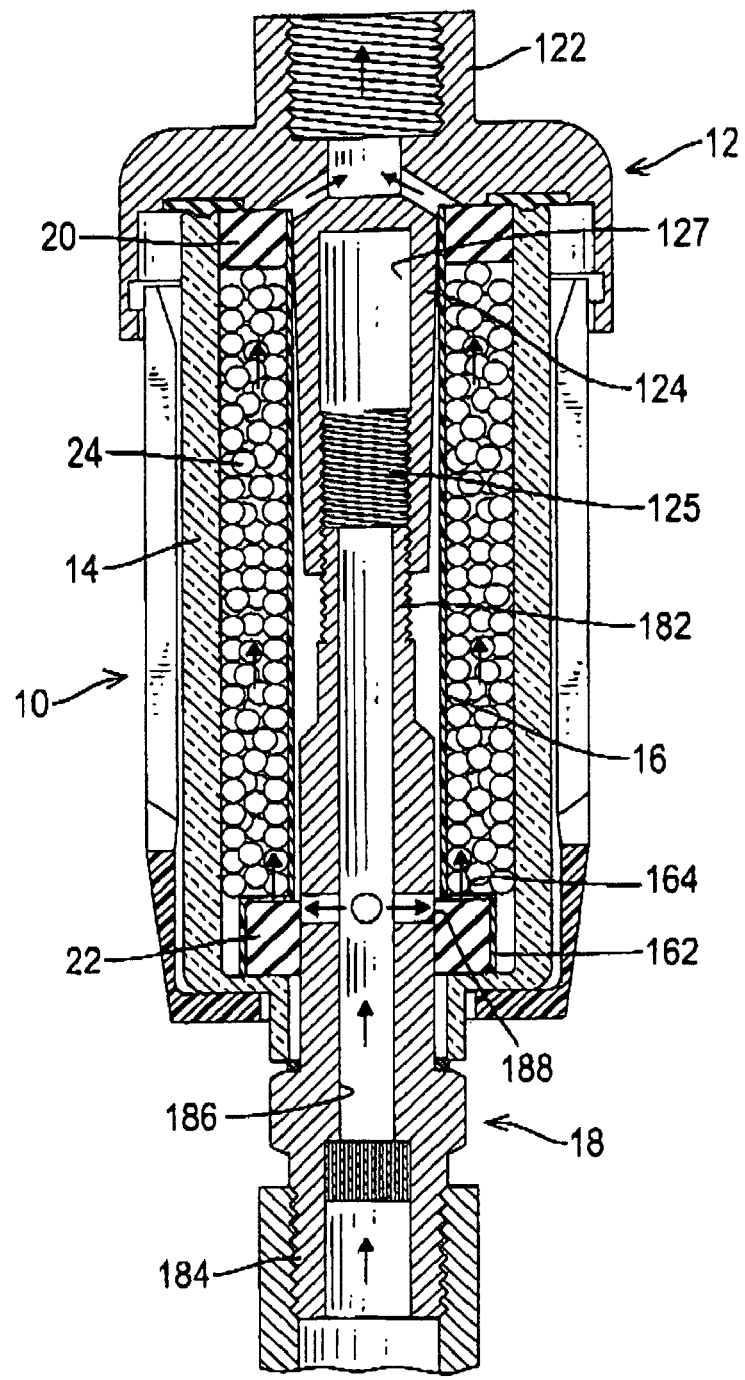
FIG. 3 is a side plan view in partial cross section of the filter assembly in FIG. 1.
Figure 4:
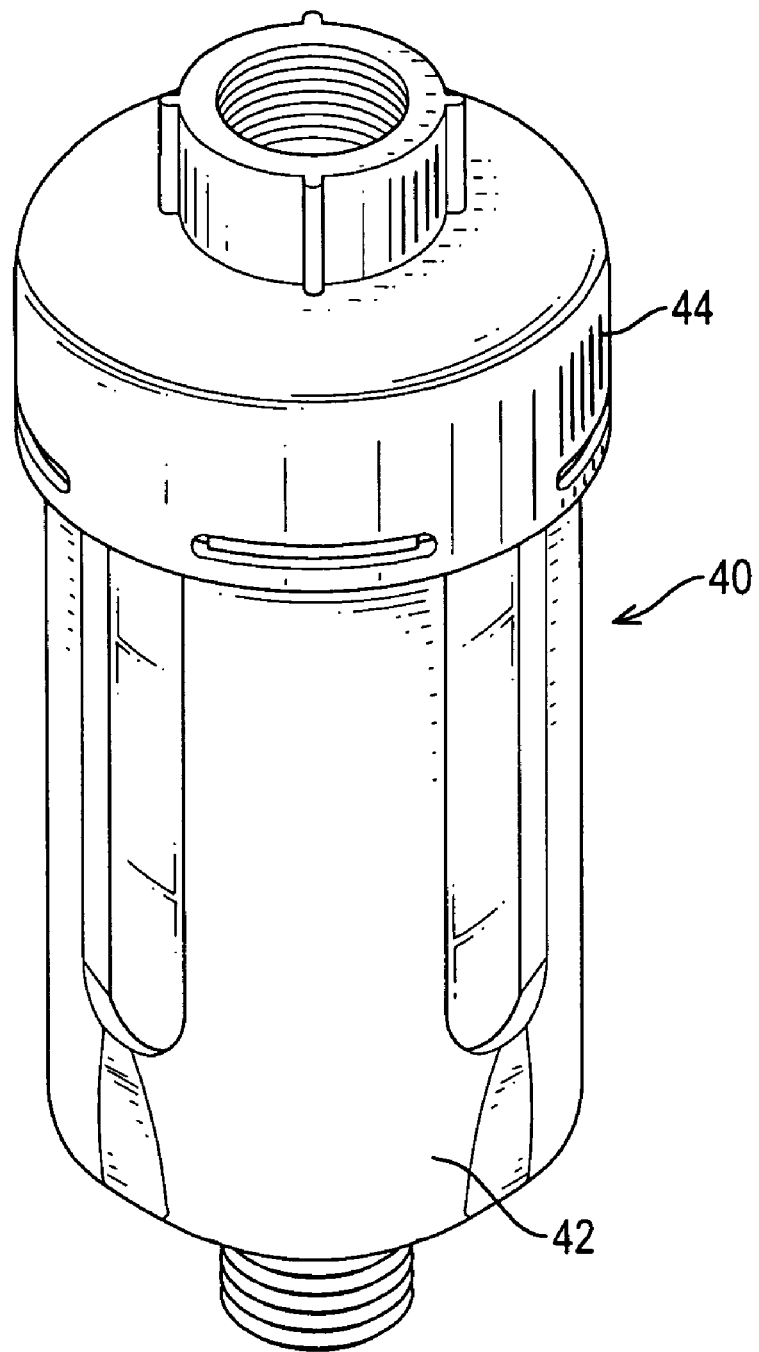
FIG. 4 is a perspective view of a conventional filter assembly in accordance with the prior art.
Figure 5:
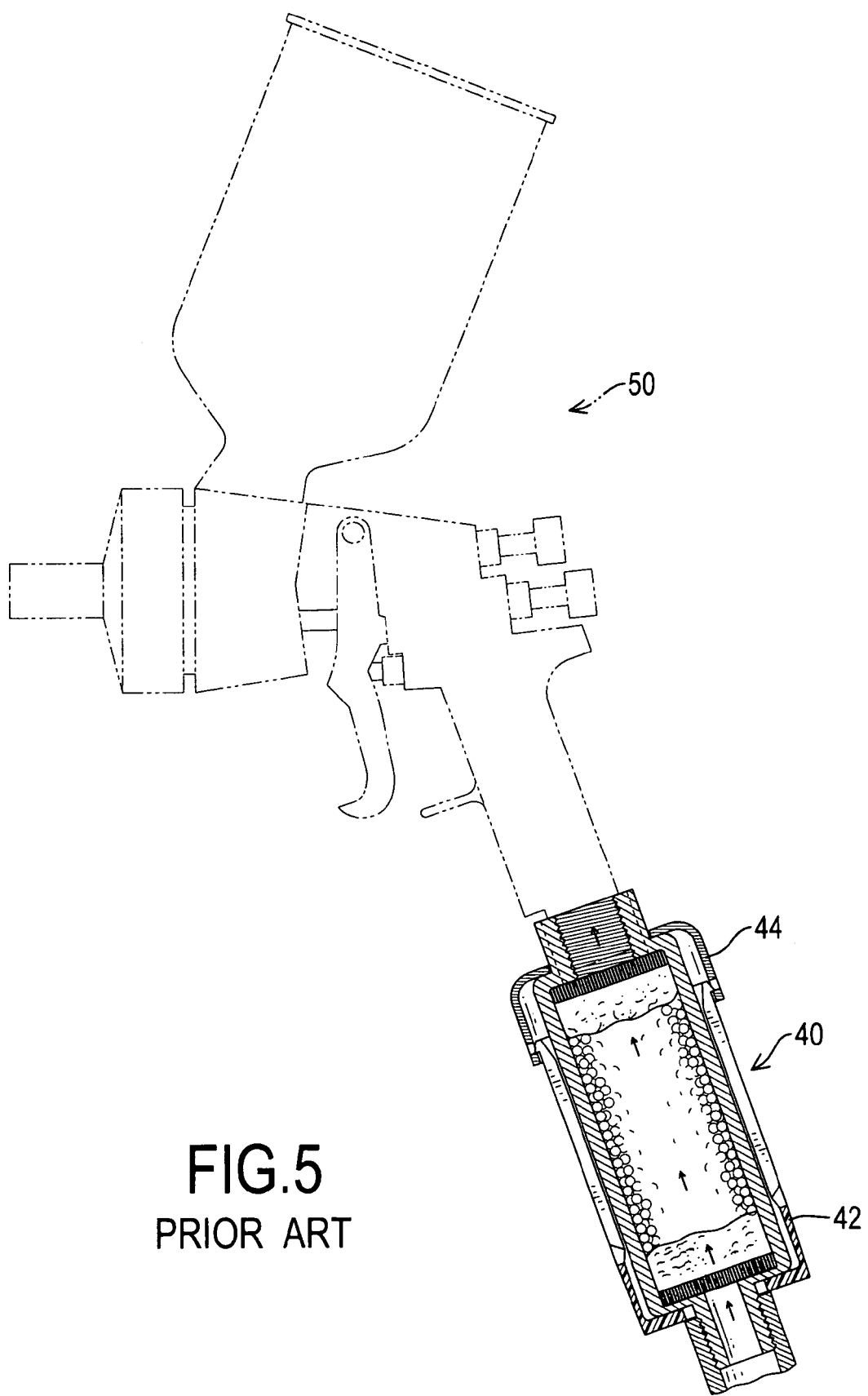
FIG. 5 is an operational side plan view in partial cross section of a pneumatic tool with the conventional filter assembly in FIG. 4 attached.

With reference to FIGS. 1 to 3, a filter assembly for a pneumatic tool comprises an outer housing (10), an inner housing (14), a cover (12), an inner tube (16) and a connecting post (18). The outer housing (10) has an open top and a closed bottom provided with a through hole (102).

The inner housing (14) is mounted inside the outer housing (10) and has an open top and bottom. The bottom is provided with a tubular protrusion (142) extending through the through hole (102) in the closed bottom of the outer housing (10).

The cover (12) is attached to the open top of the inner housing (14) to close the open top and has a connecting portion (122), at least one air passage (126) and a connecting tube (124). The connecting portion (122) is formed on the cover (12), and is adapted to connect to the pneumatic tool and has an inner space. In a preferred embodiment, the connecting portion (122) has an inner thread to connect with a handle of the pneumatic tool. The at least one air passage (126) is defined in the cover (12) and communicates with the inner space in the connecting portion (122). The connecting tube (124) is formed on and extends down from the bottom of the cover (12) and has an inner thread (125) and an inner space (127) kept free from communicating with the at least one air passage (126) in the cover (12).

The inner tube (16) is mounted inside the inner housing (14) and defines an annular space between the inner tube (16) and the inner housing (14) to hold filters (20,22) or drying agents (24) inside. The connecting tube (124) on the cover (12) extends into the inner tube (16). The inner tube (16) has a bottom provided with an annular skirt (162) and multiple vents (164) defined through the skirt (162) and communicating with the annular space between the inner tube (16) and the inner housing (14). A filter (22) can be held inside the annular skirt (162).

The connecting post (18) extends into the inner tube (16) and is detachably connected with the cover (12). In a preferred embodiment, the connecting post (18) extends through the tubular protrusion (142) on the inner housing (14) and into the inner tube (16). The connecting post (18) has a top outer thread (182) screwed with the inner thread (125) in the connecting tube (124) on the cover (12). With the engagement of the threads (125,182), the connecting post (18) is detachably connected with the cover (12). The connecting post (18) further has an air channel (186) defined in the bottom end of the connecting post (18), preferably through the connecting post (18) and multiple discharging holes (188). The air channel (186) communicates with the inner space (127) in the connecting tube (124). The discharging holes (188) are radially defined in the connecting post (18) and communicate with the air channel (186) in the connecting post (18) and the inner space between the inner tube (16) and the inner housing (14) via the annular skirt (162) and vents (164) on the inner tube (16). In addition, the connecting post (18) further has a bottom thread (184) formed on the bottom end and connected with a hose that is connected to a pressurized air source.

With such an arrangement, the assembly filter is attached to a handle of a pneumatic tool with the connecting portion (122) on the cover (12), and is connected to a pressurized air source with the bottom thread (184) on the connecting post (18). The pressurized air flows into the air channel (186) in the connecting post (18), and enters the annular space between the inner tube (16) and the inner housing (14) via the discharging holes (188) in the connecting post (18), the annular skirt (162) and the vents (164) on the inner tube (16). Accordingly, moisture and miscellaneous particles is leached by the filters (20,22) and drying agents (24) held inside the annular space and the annular skirt (162). Then, the filtered air enters the pneumatic tool via the air passages (126) and the inner space in the connecting portion (122) on the cover (12) to provide a power source for actuating the pneumatic tool. Accordingly, the pneumatic tool will not be oxidized or damaged, and the useful life of the pneumatic tool is prolonged.

When the filters (20,22) or the drying agents (24) achieve a saturation condition and lose leaching effectiveness, the connecting post (18) is detached from the cover (12) by rotating the connecting post (18) or the cover (12). Accordingly, the filter assembly can be disassembled, and new filters (20,22) or drying agents (24) can be put inside the annular space between the inner tube (16) and the inner housing (14) or the annular skirt (162) on the inner tube (16) to replace with the old ones. After combining the connecting post (18) and cover (12), the filter assembly with new filters (20,22) or drying agents (24) can be use again to provide further filtering and leaching functions. Therefore, the filter assembly in accordance with the present invention can be used repeatedly at a lower cost and is friendly to the environment.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A filter assembly for a pneumatic tool comprising
    an inner housing;
    a cover attached to the inner housing and having a connecting portion with an inner space formed on the cover to connect with the pneumatic tool and at least one air passage defined in the cover and communicating with the inner space in the connecting portion, the cover having a connecting tube extending from a bottom of the cover;
    an inner tube mounted inside the inner housing and defining an annular space between the inner tube and the inner housing to hold filters and/or drying agents inside and communicating with the at least one air passage in the cover; and
    a connecting post extending into the inner housing and the inner tube, detachably connected with the connecting tube of the cover and having a bottom end, an air channel defined in the bottom end and multiple discharging holes defined in the connecting post and communicating with the air channel in the connecting post and the annular space between the inner tube and the inner housing, wherein the connecting tube of the cover extends into the inner tube and has an inner space communicating with the air channel in the connecting post but kept free from communicating with the at least one air passage in the cover.

2. The filter as claimed in claim 1 further comprising an outer housing mounted around the inner housing to hold the inner housing inside.

3. The filter as claimed in claim 2, wherein
    the outer housing has an open top and a closed bottom provided with a through hole;
    the inner housing has an open top covered by the cover and a bottom provided with a tubular protrusion extending through the through hole in the closed bottom of the outer housing; and
    the connecting post extends through the tubular protrusion on the inner housing and into the inner tube to connect with the cover.

4. The filter as claimed in claim 3, wherein
    the connecting tube of the cover has an inner thread; and
    the connecting post has a top outer thread screwed with the inner thread in the connecting tube on the cover.

5. The filter as claimed in claim 4, wherein the bottom end of the connecting post has a bottom thread to be adapted to connect with a pressurized air source.

6. The filter as claimed in claim 5, wherein the inner tube has a bottom provided with an annular skirt and multiple vents defined through the skirt and communicating with the annular space between the inner tube and the inner housing and the discharging holes in the connecting post.

7. The filter as claimed in claim 3, wherein the inner tube has a bottom provided with an annular skirt and multiple vents defined through the skirt and communicating with the annular space between the inner tube and the inner housing and the discharging holes in the connecting post.

8. The filter as claimed in claim 1, wherein
    the connecting tube of the cover has an inner thread; and
    the connecting post has a top outer thread screwed with the inner thread in the connecting tube on the cover.

9. The filter as claimed in claim 8, wherein the bottom end of the connecting post has a bottom thread to be adapted to connect with a pressurized air source.

10. The filter as claimed in claim 9, wherein the inner tube has a bottom provided with an annular skirt and multiple vents defined through the skirt and communicating with the annular space between the inner tube and the inner housing and the discharging holes in the connecting post.

11. The filter as claimed in claim 1, wherein the bottom end of the connecting post has a bottom thread to be adapted to connect with a pressurized air source.

12. The filter as claimed in claim 11, wherein the inner tube has a bottom provided with an annular skirt and multiple vents defined through the skirt and communicating with the annular space between the inner tube and the inner housing and the discharging holes in the connecting post.

13. The filter as claimed in claim 1, wherein the inner tube has a bottom provided with an annular skirt and multiple vents defined through the skirt and communicating with the annular space between the inner tube and the inner housing and the discharging holes in the connecting post.

* * * * *